(12) United States Patent
Kurata (10) Patent No.: US 8,947,356 B2
(45) Date of Patent: Feb. 3, 2015

(54) SUSPENDED INPUT SYSTEM

(75) Inventor: Kenichi Kurata, Tokyo (JP)

(73) Assignee: Empire Technology Development LLC, Wilmington, DE (US)

( * ) Notice: Subject to any disclaimer, the term of this patent is extended or adjusted under 35 U.S.C. 154(b) by 565 days.

(21) Appl. No.: 13/254,635

(22) PCT Filed: Mar. 31, 2011

(86) PCT No.: PCT/US2011/030770
§ 371 (c)(1),
(2), (4) Date: Sep. 2, 2011

(87) PCT Pub. No.: WO2012/134485
PCT Pub. Date: Oct. 4, 2012

(65) Prior Publication Data
US 2012/0249412 A1   Oct. 4, 2012

(51) Int. Cl.
*G06F 3/033* (2013.01)
*G06F 3/0346* (2013.01)

(52) U.S. Cl.
CPC ................... *G06F 3/0346* (2013.01)
USPC .......................... 345/158; 345/156

(58) Field of Classification Search
CPC ........... G06F 3/01; G06F 3/03; G06F 3/0346; G06F 3/016; G06F 3/011; G06F 3/038; G06F 3/03543; G06F 3/0338; G06F 3/0412
USPC .......................... 345/156–158, 173
See application file for complete search history.

(56) References Cited

U.S. PATENT DOCUMENTS

| | | | | | |
|---|---|---|---|---|---|
| 4,585,282 | A | * | 4/1986 | Bosley | 310/90.5 |
| 4,874,998 | A | * | 10/1989 | Hollis, Jr. | 318/568.21 |
| 4,901,456 | A | * | 2/1990 | Cotutsca | 40/711 |
| 5,146,566 | A | * | 9/1992 | Hollis et al. | 710/73 |
| 6,154,353 | A | * | 11/2000 | Bowers et al. | 361/144 |
| 7,110,236 | B2 | * | 9/2006 | Joachim | 361/139 |
| 7,755,605 | B2 | * | 7/2010 | Daniel et al. | 345/156 |
| 7,898,133 | B2 | * | 3/2011 | Lieberman | 310/90.5 |
| 8,258,663 | B2 | * | 9/2012 | Smoot et al. | 310/90.5 |
| 2001/0038380 | A1 | | 11/2001 | Salcudean et al. | |
| 2003/0176144 | A1 | * | 9/2003 | Fisher et al. | 446/133 |
| 2006/0209019 | A1 | | 9/2006 | Hu et al. | |
| 2007/0170798 | A1 | | 7/2007 | Gohin et al. | |
| 2010/0036394 | A1 | | 2/2010 | Mintz et al. | |
| 2010/0115455 | A1 | | 5/2010 | Kim et al. | |
| 2011/0037608 | A1 | | 2/2011 | Hou et al. | |

FOREIGN PATENT DOCUMENTS

| | | | |
|---|---|---|---|
| JP | 06289952 A | * | 10/1994 |
| JP | 2009527207 A | | 7/2009 |

OTHER PUBLICATIONS

English Language Machine Translation of JP-06289952.*
International Search Report and Written Opinion dated Jun. 15, 2011 in Appl. No. PCT/US2011/030770, filed Mar. 31, 2011.
Wii—From Wikipedia, the free encyclopedia, prototype revealed in Tokyo 2005, 23 pages.

* cited by examiner

*Primary Examiner* — Jason Mandeville
(74) *Attorney, Agent, or Firm* — Knobbe, Martens, Olson & Bear, LLP (57) ABSTRACT

Provided herein are input devices, systems, and methods. Some of the embodiments provided herein employ magnetic levitation of a controller of the input system so as to allow various benefits to a user's experience of the input system.

6 Claims, 6 Drawing Sheets

SUSPENDED INPUT SYSTEM

CLAIM FOR PRIORITY

This application in the U.S. national phase entry under 35 U.S.C. §371 of PCT/US2011/030770, filed Mar. 31, 2011, the entire disclosure of which is hereby incorporated by reference herein.

TECHNICAL FIELD

The present invention relates, in general, to input devices, systems, and methods.

BACKGROUND

An input device, such as a mouse, video game controller, or a keyboard, allows a user to control position or other types of information regarding a virtual object. For manipulating a three-dimensional (3D) virtual object on a screen, 3D input devices, for example, a remote controller for a video game (Wii remote) and a 3D pointing device (Labtec SpaceBall 3D) can be used.

SUMMARY

In some embodiments, a suspended input device is provided. The device includes a controller including a magnetic body, a sensor to detect a position, an orientation, or a position and an orientation of the controller and to generate a signal regarding the position, orientation, or position and orientation of the controller, and a first magnetic field generator in a base to generate a first magnetic field. The controller can remain suspended due to a force between gravity and at least the first magnetic field.

In some embodiments, a method of manipulating spatial information is provided. This method includes generating a first magnetic field in a base and suspending a controller by a force between gravity and at least the first magnetic field, moving the controller, and providing position, orientation, or position and orientation information from the controller.

In some embodiments, a controller that has housing, at least one display surface positioned on the housing, a magnetic body capable of suspending the housing in air by a magnetic force is provided.

In some embodiments, the magnetic body of the suspended input device is a magnet, a material that is magnetic, an electromagnet, or any combination thereof.

In some embodiments, the suspended input device includes a communication module which transmits the signal regarding the position, orientation, or position and orientation of the controller to a computer and receives further signals from the computer. The computer can be connected to at least one display. Upon receiving the signal from the communication module, the at least one display displays one or more images of a virtual object with position, orientation, or position and orientation information from the signal.

In some embodiments, the magnetic body of the suspended input device is a second magnetic field generator that generates a second magnetic field substantially at a center of the controller. Due to the first and second magnetic fields, the controller rotates while staying in the same position.

In some embodiments, the magnetic field generator of the controller is positioned within the housing such that the housing can be suspended in the air via the magnetic body. The housing can rotate around a first axis of rotation, a second axis of rotation and a third axis of rotation while staying in a same position. The first axis of rotation can be oriented perpendicularly to the second and third axes of rotation and wherein the second axis of rotation is oriented perpendicularly to the first and third axes of rotation.

In some embodiments a method of manipulating spatial information is provided. In some embodiments, this can include generating a first magnetic field around a base, suspending a controller by a force between gravity and at least the first magnetic field, moving the controller, and providing position, orientation, or position and orientation information from the controller.

In some embodiments, a suspended input device is provided. In some embodiments, the suspended input device can include a controller including a magnetic body and a sensor configured to detect a position, an orientation, or a position and an orientation of the controller and to generate a signal regarding the position, orientation, or position and orientation of the controller. The suspended input device can also include a base including a first magnetic field generator configured to generate a first magnetic field. In some embodiments, the controller is configured to remain suspended due to a force between gravity and at least the first magnetic field.

In some embodiments, a controller is provided. The controller can include a housing, at least one display surface positioned on the housing, and a magnetic body configured to be capable of suspending the housing in air by a magnetic force.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Operating traditional 3D input devices may not be as intuitive as desired for many users and may require a high degree of learned skills in order to adequately and easily manipulate a three-dimension graphical representation of an object. In part, this is due to the fact that these devices are subject to gravity and the user is required to hold the input device against gravity (or other external forces). Thus, the user may not have flexibility to freely point to a point of interest on the three-dimensional object or to freely operate the three-dimensional object with commands, such as indicating actions such as sliding, rotating, magnifying, and reducing images corresponding to the three-dimensional graphic object.

Furthermore, in video games, (and in many input receiving devices, such as medical imaging systems, x-ray computed tomography (CT) devices, and magnetic resonance imaging (MRI) devices), it can be beneficial to allow for a greater degree of manipulation of a three-dimensional graphical representation of an object on a screen. Therefore, in some situations, there can be a benefit for an intuitive device and/or method that allows the user to manipulate virtual objects, shown as images, in a tactile manner, without requiring learned skills to operate the input device.

In some embodiments, a suspended input device is provided herein that allows for three-dimensional manipulation of an object that is at least partially suspended by a magnetic force. In some embodiments, by using magnetic levitation, a manipulatable controller can be suspended without any required additional supporting aspects. In some embodiments, a magnetic field can be created to offset the effects of the gravity and any other acceleration, thereby suspending the manipulatable controller. This suspension can allow a user to manipulate the controller in a flexible manner, without the need for a physical attachment to another object; and thus, provide the user an intuitive manner to enter various manipulations, such as magnifying, reducing, rotating, etc. through the controller to a desired system (such as images related to a three-dimensional object (e.g., a graphical representation on a computer or game system)).

In some embodiments, a suspended input device includes a controller (which can include a magnetic body), a sensor to detect a position, an orientation, or a position and an orientation of the controller and to generate a signal regarding this information, and a first magnetic field generator in a base (which can generate a first magnetic field). The base is configured to as to allow the controller to be suspended due to a force between gravity and a magnetic field generated by the first magnetic field generator.

The present disclosure first sets forth embodiments described with reference to the accompanying drawings and then provides further alternative aspects and embodiments for various parts of the systems/devices.

Figure 1:
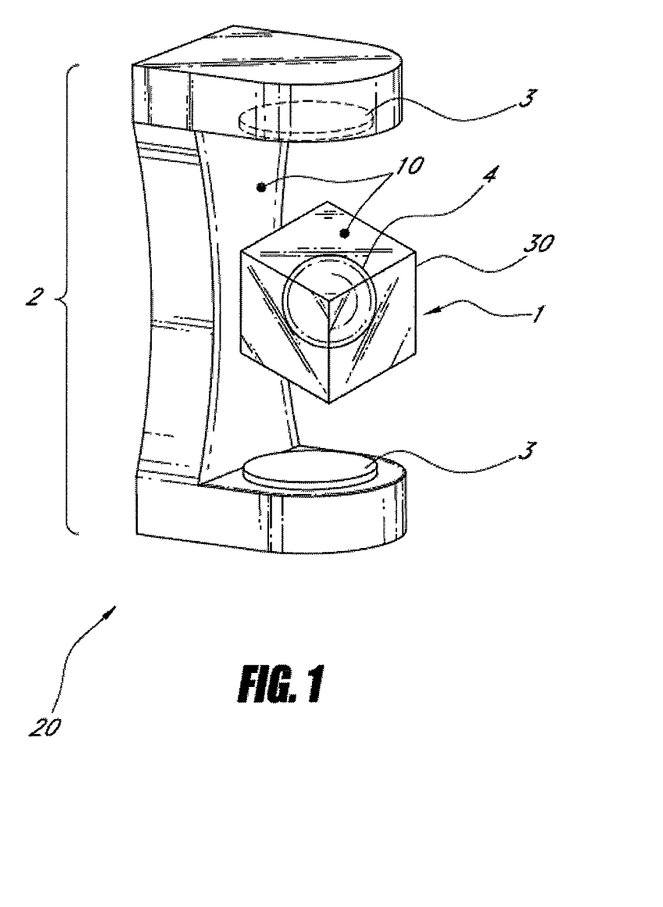
FIG. 1 is a representative view of some embodiments of a suspended input device.

FIG. 1 is a representative view of some embodiments of a suspended input device 20. In some embodiments, the device can include a controller 1, a base 2, and a sensor 10, which can be in the controller, the base, the controller and the base, or elsewhere. The controller 1 can include a magnetic body 4 by itself or it can include a housing 30. The magnetic body can be any material that is capable of responding to a magnetic force (e.g., a magnet, a magnetic metal, etc.) In some embodiments, the base includes one or more magnetic field generators 3. The magnetic field generator generates at least a first magnetic field. By controlling the first magnetic field generated by the magnetic field generator, a magnetic force due to interaction between the first magnetic field and the magnetic body within the controller can be adjusted. The magnetic force between the base magnetic field generator and the magnetic body of the controller can counteract the force of gravity (or other forces) on the controller. Thus, in some embodiments, the interaction causes the controller 1 to be suspended without any additional required support, including physical assistance of a user. In some embodiments, because the input device is suspended in the air without any restraints from a supporting member, such as cables or sticks, the controller has flexibility to rotate while staying in the same position.

In some embodiments, the controller can include a source of electric power or can be linked to a source of electrical power (either physically or by other approaches, such as induction, solar, etc.). The source of electric power can be, but is not limited to, a light-weight battery, energy received via electromagnetic waves, or one or more light-weight solar panels. Electrical power from the source of electric power can be supplied to the electromagnet to power an electromagnet, the sensor, or the display or any combination thereof.

In some embodiments, when the controller 1 is suspended, the suspended input device 20 allows the user to freely rotate the controller to change an orientation of the controller. In some embodiments, the controller also allows the user to push or pull the controller in order to change and/or alter a position of the controller. Furthermore, in some embodiments, the controller aids the user by allowing the user to point to an area of interest on the controller itself (as it is suspended) and/or to magnify or reduce an image corresponding to the point of interest on the controller (for example, by allowing manipulations to the surface of the controller). As a result of the user's interaction with the controller, it is possible to supply and/or change position, orientational, or the combination of the position and the orientational information. In some embodiments, the position information and orientational information can be spatial information providing and/or describing three-dimensional parameters, but it is not limited to such information.

In some embodiments, the sensor 10 detects position and/or orientation information regarding a position, an orientation, or a position and an orientation of the controller 1. Upon detecting the position and/or orientation, the sensor can generate a signal related to the position and/or orientation information. The position and/or orientation information can be of an absolute type (e.g., including current position information and orientation information), or a relative type (e.g., such as difference between a reference position and orientation when the sensor is locked and the current position and orientation).

Figure 2:
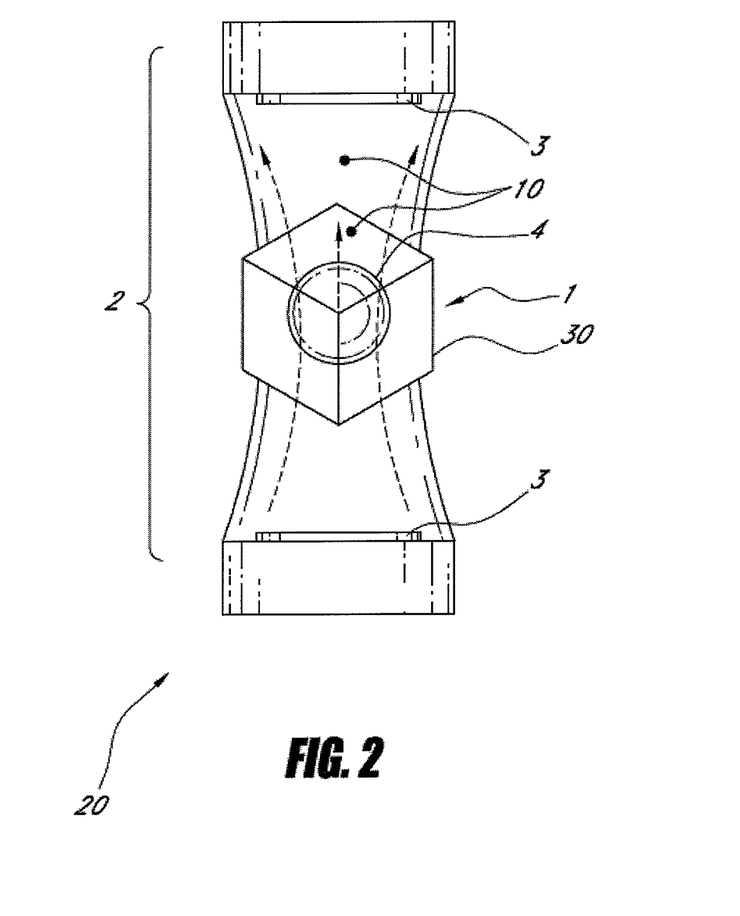
FIG. 2 is a depiction of a front view of the suspended input device.

FIG. 2 is a depiction of a front view of the suspended input device 20 depicted in FIG. 1. FIG. 2 also depicts the magnetic body 4, and the magnetic field generator 3. In some embodiments, the magnetic field can be generated substantially at a center of the controller 1.

Figure 3:
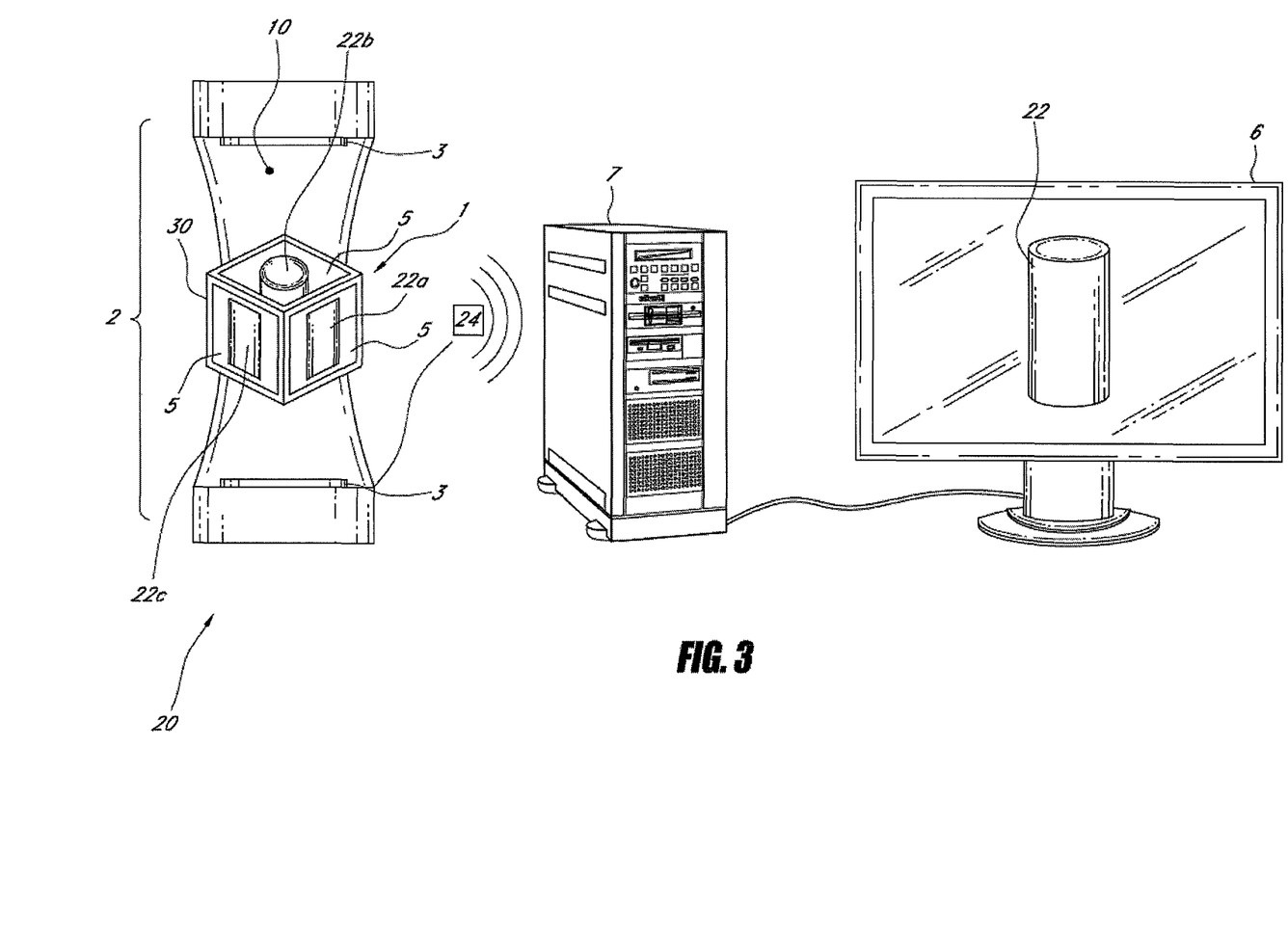
FIG. 3 is depiction of another representative view of a suspended input device in combination with a computer and an external display.

FIG. 3 is a depiction of another representative view of a suspended input device 20 in combination with a computer 7 and an external display 6.

In some embodiments, manipulation of the controller 1 allows one to manipulate the behavior of a virtual object 22, which can be displayed on the external display 6. Once the sensor 10 (which, for example, can be in the controller (depicted) or in the base), detects the position and/or orientation information, the sensor generates a signal related to the position and/or orientation information of the controller and transmits the signal to an external device via a communication module 24, (which can be, for example, in the controller or in the base (as depicted)). The external device can be, but is not limited to, the computer 7. In some embodiments, the position information and/or the orientational information includes spatial information describing three-dimensions. The signal is transmitted from the suspended input device to the computer. In some embodiments, when the computer receives the signal from the communication module, the computer can display, via the external display 6, the virtual object having position, orientation, or position and orientation information from the signal. In some embodiments, the communication module can also receive signals from the computer 7. The signal can include one or more images with regards to the virtual object, as well as the position and/or orientation information of the virtual object processed at the computer.

In some embodiments, the controller 1 further includes one or more displays 5 (also called controller displays) displaying the one or more images of the virtual object 22a, 22b, and 22c. In some embodiments, the one or more displays on the controller allows a user to receive a look and feel of the virtual object in a more natural, three-dimensional, manner; thus, the interaction with the controller can be made even more intuitive. In some embodiments, the controller includes an external surface, the housing 30, and the housing can be substantially cubic. In such a case, the housing can accommodate, for example, six different displays, each of which can provide a different view of the virtual object 22a, 22b, and 22c. In some embodiments, a top display of the controller can provide a top view of the virtual object 22b, a first side display of the controller can provide a first side view of the virtual object 22c, and a second side display of the controller can provide a second side view of the virtual object 22a.

Figure 4:
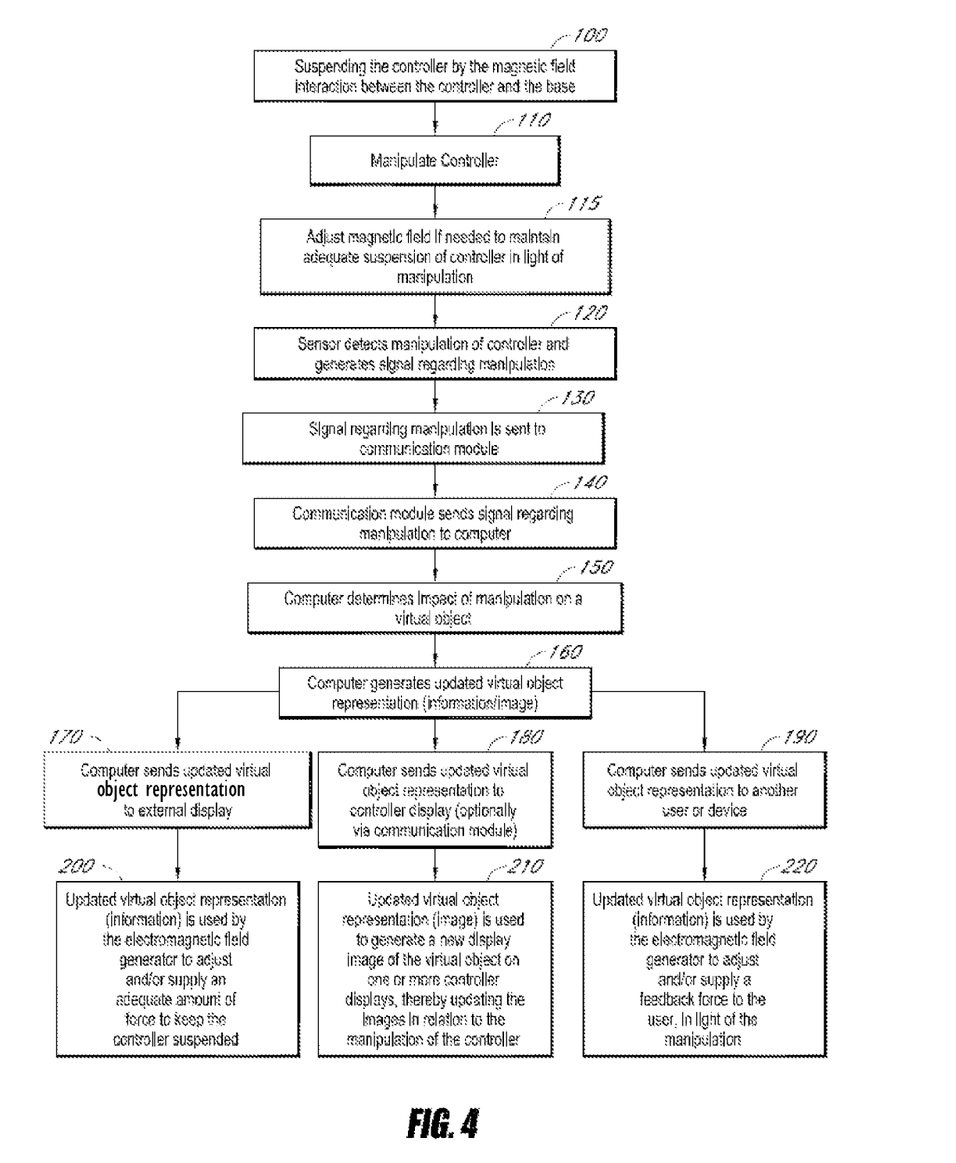
FIG. 4 is a flow diagram depicting some embodiments for how the suspended input device can be manipulated.

FIG. 4 is a flow diagram depicting some embodiments for how the suspended input device can be manipulated. In some embodiments, one can provide a suspended input device as described herein. In some embodiments, one can suspend the controller by the magnetic field interaction between the controller and the base (block 100). A user can then manipulate the controller (block 110) as desired in order to input a command. If required, the input device can adjust the magnetic field, if needed, to maintain an adequate suspension of controller in light of the physical manipulation (block 115). In some embodiments, the electromagnetic interaction can be controlled based on measurements of the position of the controller and the base. In some embodiments, the sensor can then detect the physical manipulation of controller and can generate one or more signals regarding the manipulation of the controller (block 120). In some embodiments, the signal describing the manipulation (which can include velocity and/or acceleration information, starting position, finishing position, etc) is sent to a communication module (block 130), which can be integrated into the sensor. In some embodiments, the communication module can send the signal regarding the manipulation to a computer or other device (block 140). In some embodiments, the computer or other device can then determine the result or impact of the manipulation on a virtual object, which, in some embodiments, can be a medical related object, such as, for example, cardiovascular related, brain related, liver related, or stomach related, within the computer (block 150). In some embodiments, the computer can then generate an updated virtual object representation (block 160). In some embodiments, the updated virtual object representation can be image related (for example, providing an updated image and/or perspective of the virtual object and/or its environment following the manipulation) and/or it can be information related (for example, providing information related to force feedback (if relevant), the application of other forces that the virtual object might be subjected to according to any parameters outlined by the computer or other device, temperature, or other parameters that the user might be interested in given various manipulations, etc.) In some embodiments, the updated virtual object representation includes numerical values that describe variables that are of interest to a user. In some embodiments, the computer can optionally send the updated virtual object representation to the external display (block 170). In some embodiments, the computer can optionally send the updated virtual object representation to one or more of the controller displays (which can occur via the communication module) (block 180). In some embodiments, the computer can optionally send the updated virtual object representation to another user or device (block 190). In some embodiments, block 170, block 180, and block 190 each follows block 160. In some embodiments, only one of block 170, block 180, and block 190 follows block 160. In some embodiments, two of block 170, block 180, and block 190 each follow block 160. In some embodiments, block 170 and block 180 each follow block 160. In some embodiments, block 180 and block 190 each follow block 160. In some embodiments, block 170 and block 190 each follow block 160. In some embodiments, the updated virtual object representation (information related) can be used by the electromagnetic field generator to adjust and/or supply an adequate amount of force to keep the controller suspended (block 200). In some embodiments, this occurs following block 170. In some embodiments, the updated virtual object representation (image related) can be used to generate a new display image of the virtual object on one or more controller displays, thereby updating the images in relation to the manipulation of the controller (controller block 210). In some embodiments, this occurs following block 180. In some embodiments, the updated virtual object representation (information related) can be used by the electromagnetic field generator to adjust and/or supply a feedback force to the user, through the controller, in light of the manipulation and/or any parameters set by the computer (block 220). In some embodiments, this occurs following block 190.

One skilled in the art will appreciate that for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, a method of manipulating spatial information is provided. The method can include generating a first magnetic field around a base, suspending a controller by a force between gravity and at least the first magnetic field, moving the controller, and providing position, orientation, or position and orientation information from and/or regarding the controller. In some embodiments, the method further includes transmitting a signal regarding the position, orientation, or position and orientation information of the controller to a computer. In some embodiments, the method further includes providing a display on the controller, and displaying information regarding a virtual object on the controller. The information can relate to position, orientation, or position and orientation of the virtual object. In some embodiments, the method further includes providing one or more images of a virtual object, and displaying the one or more images of the virtual object on the controller. In some embodiments, the method further involves generating a second magnetic field in the controller. The second magnetic field can be generated substantially at a center of the controller. In some embodiments, the position information or the orientation information provides spatial information describing three-dimensions.

Figure 5:
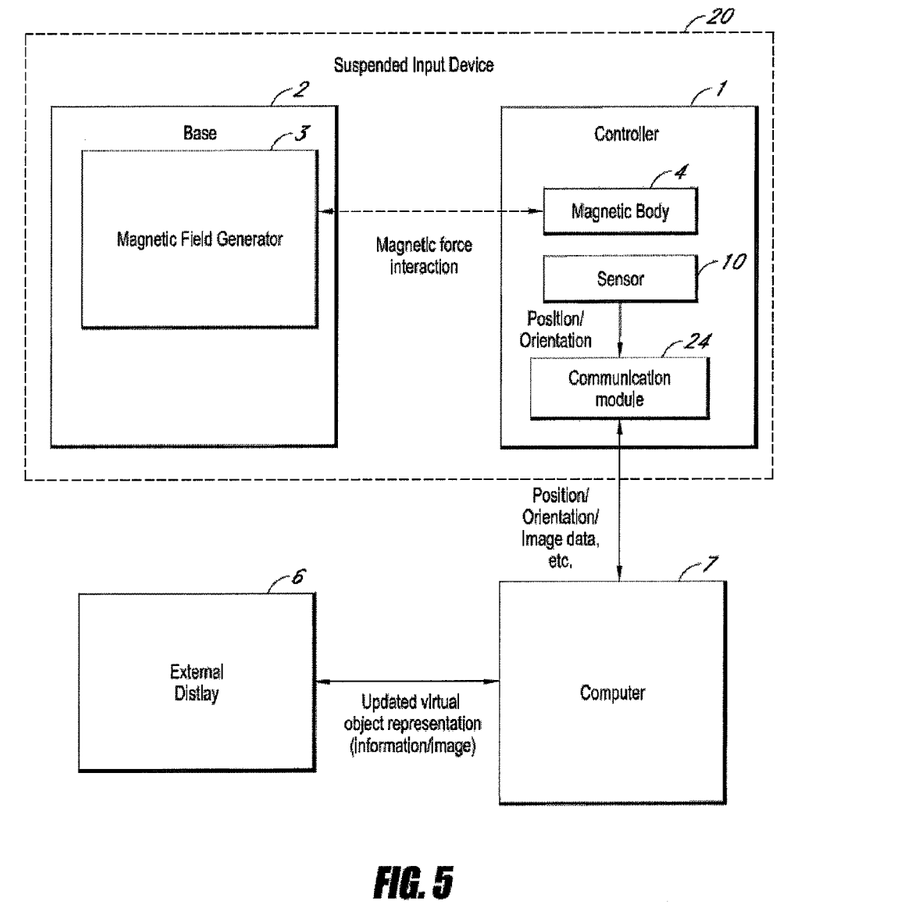
FIG. 5 is a representative schematic diagram of some embodiments where the sensor is located in the controller of the suspended input device.

FIG. 5 is a representative schematic diagram of some embodiments where the sensor 10 is located in the controller 1 of the suspended input device 20. The controller and the computer 7 communicate with each other. The controller includes a communication module 24, which may be configured to wirelessly transmit a signal. Once the sensor generates a signal related to position and/or orientation information, the communication module transmits either the signal itself, or any data related the signal, to the computer. The computer can be coupled to the external display 6. In some embodiments, the computer can also be configured to send information back to the controller so as to display an image on a display associated with the controller (e.g., on one of the displays 5 shown in FIG. 3). Upon receiving the signal indicative of position and/or orientational information from the controller, the computer can cause one or more of the displays (5 and/or 6) to display an image of a virtual object (22, 22a, 22b, and/or 22c), having and/or representing the position and/or orientation information. The computer can use the position and/or orientational information from the manipulations of the controller to appropriately make the corresponding manipulations of the images of the virtual object in the display(s). Furthermore, in some embodiments the computer can execute an application with regard to the displayed virtual object(s) and the position and/or orientation information can change due to functions of the application. In some embodiments, the computer can send an updated signal either having one or more updated images or having the further adjusted position and/or orientational information to the communication module. Upon receiving the further adjusted signal, the controller displays 5 can be updated with one or more appropriately manipulated images of the virtual object (22a, 22b, and 22c of FIG. 3). Thus, in some embodiments, manipulation of the controller allows for a corresponding manipulation of the virtual object (within the computer), which can be displayed on the external display 6, or on one or more of the controller displays 5. Furthermore, any results from the manipulation of the virtual object in the computer can (in some embodiments), result in return information to the controller in terms of adjusted images and/or forces exerted by the magnetic field generator on the magnetic body. Thus, any feedback information can simply be a result of the initial manipulation, or (if desired by a user) the result of the initial manipulation in light of the other parameters and variables in the computer. In some embodiments, the image of the virtual object on the controller display 5 can be updated as the controller is manipulated so as to maintain or provide the appropriate image as the controller is manipulated.

Figure 6:
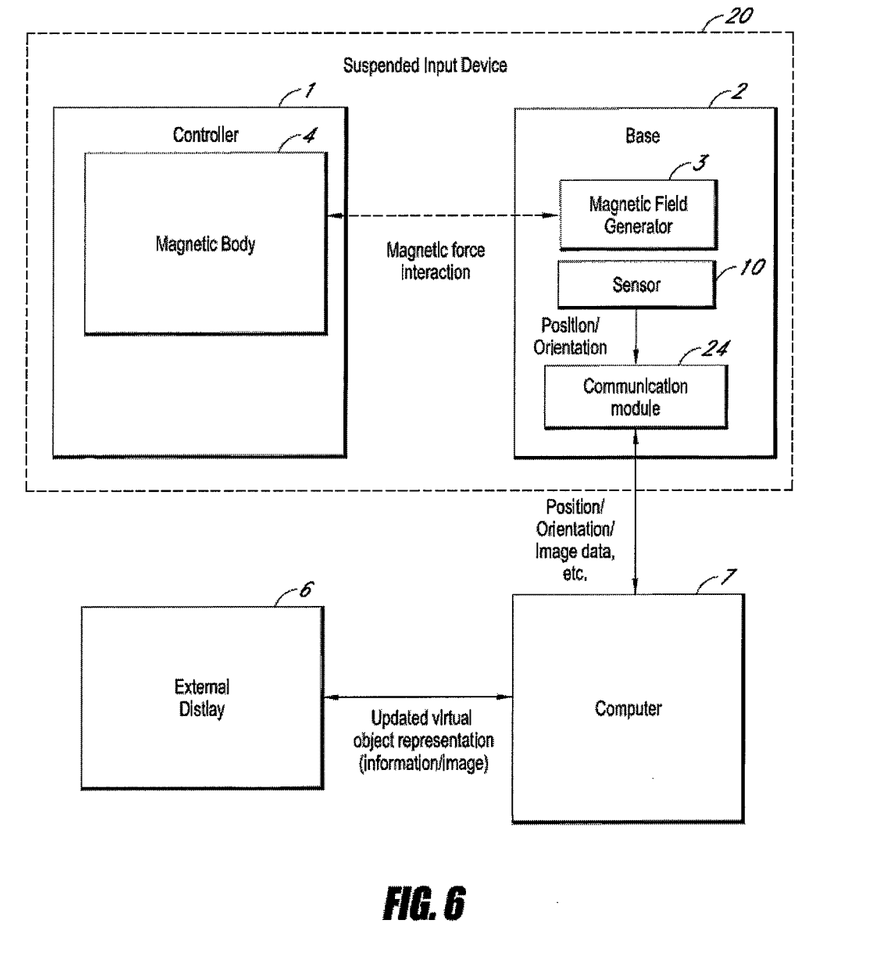
FIG. 6 is a representative schematic diagram of some embodiments where the sensor is located in the base of the suspended input device.

FIG. 6 is a representative schematic diagram of some embodiments where the sensor is located in the base of the suspended input device 20. The sensor 10 can be a motion sensor which detects movement of the controller 1. The base 2 and the computer 7 can communicate with each other. The base can include a communication module 24, which may be configured to transmit a signal. Once the sensor generates a signal related to position and/or orientation information of the controller, the communication module transmits either the signal itself, or any data related the signal, to the computer. The computer is coupled to the external display 6 which displays at least one image of a virtual object. Upon receiving the signal indicative of position and/or orientation information from the base, the computer causes the external display to display an updated image of a virtual object, having the position and/or orientation information incorporated into the displayed image. The computer may change the position and/or orientation information of the images of virtual object, according to the signal from the controller and display the virtual object in the coupled monitor display. Furthermore, in some embodiments, the computer can execute an application with regard to the virtual object and the position and/or orientation information may change due to functions and/or parameters of the particular application in the computer. For example, a virtual barrier or structure may also be present and adjacent to the virtual object, thereby limiting or impacting the ability of the virtual object to rotate in space, which in turn can either show up as images on a display or as a force feedback in the controlling, making it more difficult for the user to manipulate the controller into the forbidden space.

Additional Embodiments and Variations

For the sake of clarity and brevity, the following variations are provided, with the understanding that these variations are contemplated as being combined and/or applied in any of the embodiments described herein. The headings used herein are for convenience only and are in no way intended to limit or exclude additional and/or alternative embodiments and/or combinations.

Controller

In some embodiments, the controller includes a housing, by which a user can manipulate the controller, and a magnetic body, by which the magnetic field generator can exert a magnetic field on the controller.

In some embodiments, the controller includes a housing, at least one display surface positioned on the housing, and a magnetic body configured to be capable of suspending the housing by a magnetic force. In some embodiments, the controller further includes a sensor connected to the housing and configured to detect position, orientation, or position and orientation information of the housing. In some embodiments, the controller further includes the communication module in the housing and is configured to transmit signals to a computer and to receive signals from a computer. In some embodiments, the communication module is configured to transmit a signal of the detected position, orientation, or position and orientation information of the housing to a computer. In some embodiments, the at least one display is configured to display an image received from a computer. In some embodiments, the housing is substantially cubic. In some embodiments, the magnetic field generator is positioned within the housing such that when the housing is suspended in the air via the magnetic body, the housing can rotate around a first axis of rotation, a second axis of rotation, and a third axis of rotation while staying in a same position. The first axis of rotation is oriented perpendicularly to the second and third axes of rotation and the second axis of rotation is oriented perpendicularly to the first and third axes of rotation.

Housing

In some embodiments, the housing of the controller is a surface of the controller. In some embodiments, the housing allows the user to change a position and/or orientation and/or interact with the controller. In some embodiments, the housing can be an outer shell that surrounds the magnetic body in the controller. In some embodiments, the housing includes one or more surfaces. In some embodiments, these surfaces can be displays and/or display surfaces. In some embodiments, the surfaces allows for ease of manipulation of the controller. In some embodiments, the housing includes two or more surfaces, for example, 2, 3, 4, 5, 6, 7, 8, 9, 10, 11, 12, 13, 14, 15, 16, 17, 18, 19, 20, 25, 30, 35, 40, 45, 50, or more surfaces, including any range greater than any of the preceding values and any range defined between any two of the preceding values. In some embodiments, the housing can be spherical (or practically spherical). In some embodiments, the housing has a number of surfaces adequate to display a desired number of images and/or perspectives of the virtual object to be manipulated. Thus, very simple virtual objects (such as a virtual cube), can employ a cube housing (so that the six surfaces of the cube housing can display each of the perspectives of the six sides of the virtual cube). More complex virtual objects can be paired with a housing having a greater number of sides (although this is not a requirement). In some embodiments, more complex housings can be used with simpler virtual objects so that a larger number of displays can be provided showing a greater number of perspectives. In some embodiments, the housing has a shape that is roughly the same as the virtual object to be manipulated. In some embodiments, the housing has a shape that is the same as the virtual object to be manipulated.

In some embodiments the housing is not magnetic. In some embodiments, the housing can be influenced by magnetic forces and/or can be a magnet. In some embodiments, the housing can be the surface of the magnetic body.

In some embodiments, the housing is composed of plastic, metal, glass, rubber, wood, or other material. In some embodiments, the housing is detachable from the magnetic body so that various housings can be used on a magnetic body, according to the virtual object.

In some embodiments, the housing is relatively light in weight so that the magnetic fields involved can be lower in strength. In some embodiments, the housing is hollow or a shell.

In some embodiments, the housing can include a source of power (such as a battery). In some embodiments, the housing can include one or more of the controller displays. The controller displays can be the surface of the controller itself (and, for example, have the image projected by an outside projector onto the surface), or a self generating display, such as a LCD or LED type display. In some embodiments, the housing is transparent or clear. In some embodiments, the controller includes a magnetic field generator. In some embodiments, the controller includes one or more sensors. In some embodiments, the controller includes a communication module. In some embodiments, an organic electro-luminescence device can be included or use as the display.

Magnetic Body

As noted above, in some embodiments, the magnetic body of the controller can be a magnet or a material that is magnetic (such as a ferrous material). For example, the magnet or the magnetic material can be, but is not limited to, a permanent magnet that includes a paramagnetic material, such as, Tungsten, Samarium, or Neodymium. In some embodiments, the material is relatively lightweight. In some embodiments, the material can be processed into a ferromagnet, such as a ferrite magnet, samarium-cobalt magnet, neo-magnet, for example. In some embodiments, the magnetic body of the controller can be an electromagnet. The electromagnet typically includes a core of ferromagnetic material, such as iron, for example, and a coil of insulated wire wrapped around the core which lets an electric current flow. Due to the flow of the electric current, a magnetic field can be produced.

In some embodiments, the magnetic body can be a magnetic field generator positioned in the housing. The magnetic field generator generates a magnetic field. If the magnetic field of the controller, an external magnetic field, and the gravity interact together, a magnetic force to suspend the controller can be generated. When the housing is suspended in the air via the magnetic body, due to the magnetic force, the housing can rotate around three axes of rotation while staying in a same position. A first axis of rotation can be oriented perpendicularly to second and third axes of rotation and the second axis of rotation can be oriented perpendicularly to the first and third axes of rotation.

Display(s)

In some embodiments the controller includes a display. In some embodiments, the controller includes more than one display, for example, 2, 3, 4, 5, 6, 7, 8, 9, 10 or more displays. In some embodiments, the display on the controller is self contained, and thus, the display produces the image itself. In such embodiments, the display can be a DLP display, LCD display, LED display, interferometric display, OEL, digital ink, or other display. In some embodiments, the display includes a display surface, such as a surface that allows for an image to be projected onto it. In some embodiments, this can be of a material having similar properties of a projection screen. In some embodiments, the surface can be light in color (such as white or light grey) and be relatively flat, so that an image can be projected onto it.

In some embodiments, an image of the virtual object produced by the display can be an image of an object to be manipulated by the controller. In some embodiments, the image can correspond to the object that is to be manipulated. In some embodiments, the image of the virtual object corresponds to an appropriate perspective of the object. For example, a top display can display a top down view of the object, a bottom display can display a bottom view, and the side displays can display corresponding side views. In some embodiments, the displays can display information in regard to the object and its manipulations. For example, stress forces or other forces that the virtual object might be calculated (e.g., by the computer) to receive in light of various manipulations of the controller can be displayed on controller displays. In some embodiments this is done by displaying numerical values. In some embodiments this can be achieved by color, shading, or other depictions on or over the relative image of the object. As such, in some embodiments, a user can watch the controller displays as the controller is manipulated, to thereby observe any feedback or resulting information generated by the computer (or other source). Thus, resulting force can be observed in the same location that the user is providing the manipulation for the object.

In some embodiments, an external display is associated with the computer. The display can be any type of display device that can output an image of the virtual object from the computer.

Base

In some embodiments, the base is an object that can house or position a magnetic body or magnetic field generator. In some embodiments, the base positions the magnetic field generator beneath the controller so that the magnetic field generator can provide a repelling magnetic field that can suspend the controller. In some embodiments, the base positions the magnetic field generator above the controller so that the magnetic field generator can provide an attracting magnetic field that can suspend the controller. In some embodiments, the base provides positioning for more than one magnetic field generator (see for example, FIG. 1). In some embodiments, the base positions a first magnetic field generator beneath the controller and a second magnetic field generator above the controller so that the magnetic field generators can provide a repelling magnetic field and an attracting magnetic field that can suspend the controller.

In some embodiments, the base is composed of a nonferrous and/or non-magnetic material. In some embodiments, the base is configured so as to allow ease of manipulation of the controller. In some embodiments, the base is configured so as to allow ease of manipulation of the controller in at least two dimensions. In some embodiments, the base is configured so as to allow ease of manipulation of the controller in at least three dimensions. In some embodiments, the base comprises two or more rods or sticks that include a magnetic body (such as a magnetic field generator) at an end of each rod. In such an embodiment, the controller can be controlled when, for example, four of these rods are disposed on each corner of a tetrahedron. In some embodiments, one or more rod is used to achieve the end result.

Magnetic Field Generator

In some embodiments, the magnetic field generator can be located in the base of the suspended input system. In some embodiments, the magnetic field generator can be located in the controller of the suspended input system. In some embodiments, there is a magnetic field generator in both the controller and the base. In some embodiments, the base and/or controller include more than one magnetic field generator. In some embodiments, the base includes at least two magnetic field generators, one can be positioned above the controller and one can be positioned beneath the controller. In some embodiments, the base, controller, and/or suspended input system each or together includes 2, 3, 4, 5, 6, 7, 8, 9, 10, 15, 20 or more magnetic field generators. In some embodiments, the magnetic field generators are positioned so as to allow for the force of gravity to pressure the controller against a magnetic field generated by the magnetic field generator.

In some embodiments, the magnetic field generator includes one or more electromagnets. In some embodiments, the magnetic field generator includes one or more magnets. In some embodiments, the electromagnetic field generator is beneath, above, and/or on the side of the controller.

Source of Electrical Power

In some embodiments, the controller (and/or the base) includes a source of electrical power. In some embodiments, the source of electrical power can supply power to the controller displays, a controller located sensor, an electromagnet in the controller, etc. In some embodiments, the base includes a source of electrical power. This base source of electrical power can supply power to a base located sensor and/or an electromagnet in the base, etc. In some embodiments the base and controller are supplied by a same source of electrical power and the power is shared by induction, radiant energy, a wired connection, etc. In some embodiments, the sources are separate from one another. In some embodiments, power can be shared between the base and the controller by inductive charging. Thus, in some embodiments, the base can include a first induction coil and the controller can include a second induction coil.

In some embodiments, all of the electricity requiring components of the suspended input device are included in the controller. In some embodiments, all of the electricity requiring components of the suspended input device are included in the base. In some embodiments, neither the base nor the controller include components that require electricity, and instead, they include a collection of magnetic bodies for suspending the device. In some embodiments, the sensors, communication module, etc. can be external from the controller and the base in some embodiments.

Communication Module

In some embodiments, the communication module can be configured to transmit the signal regarding the position, orientation, or position and orientation of the controller to a computer. In some embodiments, the communication module can be configured to receive signals from the computer or other device and transmit them to one or more of the magnetic field generators and/or the controller and/or the device. In some embodiments, the signals to the communication module from the computer provide information to be depicted on the controller displays 5. In some embodiments, the signals to the communication module from the computer provide information to adjust the magnetic field such that the controller remains suspended against another movement or force. In some embodiments, the signals to the communication module from the computer provide information to adjust the magnetic field so that a "force-feedback" aspect is provided in the device. For example, in some embodiments, when a virtual object that is being manipulated by a user interacts with another virtual boundary (defined, for example, in the computer), the magnetic field responsible for suspending the controller can be altered so as to provide increased resistance against further manipulation of the controller in the appropriate direction. Such an arrangement can provide tactile feedback to the user to provide the user with even greater ability to manipulate and understand the manipulations of the virtual targets within the computer.

Sensor

In some embodiments, an infrared sensor can be located as the sensor in the base. The infrared sensor may be of, but not limited to, a passive infrared sensor, which may look for temperature change due to movements of the controller, or a proximity sensor which detects the controller as an object by emitting a beam of infrared signals. Upon detection, the infrared sensor generates a signal representative of the velocity of the controller, in a three-dimensional manner.

In some embodiments, an optic sensor can be located as the sensor (e.g., in the base or the controller). The optic sensor can convert light rays into electronic signals, and detects the presence of the controller and measures the distance to the controller due to the changes of light rays. The optic sensor may be, for example, but not limited to, a photoresistor, a light-emitting diode (LED) as a photodiode, or a charge-coupled device (CCD). Upon measurement, the optic sensor generates a signal representative of the change of the distance to the controller, in a three-dimensional manner.

In some embodiments, a supersonic sensor using ultrasonic waves can be located as the sensor in the base. The ultrasonic sensor may be of, but not limited to, a piezoelectric transducer which converts electrical energy into sound, and produces the ultrasonic waves to detect the presence of the controller and measures the distance to the controller. Upon measurement, the supersonic sensor generates a signal representative of the change of the distance to the controller, in a three-dimensional manner.

In some embodiments, an acceleration sensor can be located as the sensor in the controller. The acceleration sensor may be of, but is not limited to, a micro electro-mechanical system (MEMS). The acceleration sensor can measure displacement of the mass of the controller in a three-dimensional manner, and thus detects three-dimensional accelerations of the controller. Upon detection, the acceleration sensor generates a signal representative of the velocity of the controller, in a three-dimensional manner.

In some embodiments, a gyroscope can be located as the sensor in the controller. The gyroscope can be of, but not limited to, a micro electro-mechanical systems (MEMS) including a vibrating element. The gyroscope measures three-dimensional angular velocities of the controller, using the vibrating element based on the Faucault pendulum. Once the gyroscope detects the angular velocities, the acceleration sensor generates a signal representative of the angular velocity of the controller, in a three-dimensional manner.

Computer

The term computer is use herein to broadly denote any computational device that can contain a virtual object and adjust one or more characteristic of the virtual object in response to a signal that contains information regarding a manipulation (which can be from the controller). In some embodiments, the computer can be a laptop or desktop device. In some embodiments, the computer is part of a 3D TV, game console, DVD player, etc. In some embodiments, the computer is a specialized computational device for processes such as MRI imaging, x-ray computed tomography (CT), or controlling a robotic device. In some embodiments, the suspended input device and/or the controller is sealed. In some embodiments, the suspended input device and/or the controller has no mechanical junctions or seams so that it can be proof and/or resistant to water, water vapor, dust, etc. In some embodiments, the device is configured and/or used to provide a thumb sized force feedback input device for a mobile and/or handheld device or gadget. In some embodiments, the suspended input device located around the base on the mobile device is controlled and/or connected seamlessly and/or without a mechanical junction and/or seam. In some embodiments, the controller and/or base can be any size. In some embodiments, the controller and/or base are large. In some embodiments, the controller and/or base are small and/or mobile or pocket sized. In some embodiments, the controller is less than 30 inches across or in diameter, for example, 29, 28, 27, 26, 25, 24, 23, 22, 21, 20, 19, 18, 17, 16, 15, 14, 13, 12, 11, 10, 9, 8, 7, 6, 5, 4, 3, 2, 1 inch or smaller across or in diameter, including any range less than any of the preceding values and any range defined between any two of the preceding values.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A suspended input device comprising:
a base comprising a first magnetic field generator configured to generate a first magnetic field;
a controller comprising:
- a magnetic body comprising a second magnetic field generator configured to generate a second magnetic field substantially at a center of the controller, wherein the controller is configured to be suspended by the first and second magnetic fields, and wherein the controller is configured to rotate by user manipulation around a first axis of rotation, a second axis of rotation and a third axis of rotation while staying in a same position relative to the base, and
- a plurality of displays, each configured to display on the controller one or more images corresponding to a different view of a virtual object, wherein the controller is configured to remain suspended by magnetic levitation due to a force between gravity and at least the first magnetic field, so as to allow for three-dimensional manipulation of the controller by a user, and wherein the controller is configured so that the one or more images of the virtual object displayed respectively on the plurality of displays of the controller are updated in response to and in correspondence with manipulation of the controller;

a sensor configured to detect manipulation of a position, an orientation, or a position and an orientation of the controller relative to the base and to generate a signal regarding the position, orientation, or position and orientation of the controller, wherein either:
the controller comprises the sensor, the sensor comprising an acceleration sensor, or
the base comprises the sensor, the sensor comprising one of an infrared sensor, a supersonic sensor, an optic sensor, or any combination thereof; and
a communication module configured to transmit the signal regarding the position, orientation, or position and orientation of the controller to a computer and to receive further signals from the computer, wherein the transmitted signal regarding the position, orientation, or position and orientation of the controller enables an external display device, coupled to the computer, to display the virtual object with an updated position, orientation, or position and orientation based on content in the transmitted signal.

2. The device of claim 1, wherein the magnetic body comprises a magnet, a material that is magnetic, an electromagnet, or any combination thereof.

3. The device of claim 1, wherein the plurality of displays comprises six displays.

4. The device of claim 1, wherein the transmitted signal regarding the position, orientation, or position and orientation of the controller describes three dimensions.

5. A method to manipulate spatial information of a virtual object comprising:
generating a first magnetic field around a base;
generating a second magnetic field substantially at a center of a controller;
suspending the controller by a force between the first magnetic field and the second magnetic field, wherein the controller is configured to rotate by user manipulation around a first axis of rotation, a second axis of rotation and a third axis of rotation while staying in a same position relative to the base, wherein the controller comprises a plurality of displays, each configured to display on the controller one or more images corresponding to a different view of the virtual object, wherein the controller is configured so that the one or more images of the virtual object respectively displayed on the plurality of displays of the controller are updated in response to and in correspondence with three-dimensional manipulation of the controller by a user, wherein the plurality of displays on the controller allows the user to receive a look and feel of the virtual object in a more natural, three-dimensional manner, so that the user's interaction with the controller is made more intuitive;
moving the controller;
sensing manipulation of a position, an orientation, or a position and an orientation of the controller by the user, wherein the sensing is carried out by either:
a sensor comprising an acceleration sensor, wherein the sensor is comprised by the controller, or
a sensor comprising one of an infrared sensor, a supersonic sensor, an optic sensor, or any combination thereof, wherein the sensor is comprised by the base;
providing a signal regarding position, orientation, or position and orientation information from the controller to a computer in communication with the controller; and
updating the spatial information of the virtual object comprising position, orientation, or position and orientation information of the virtual object so as to enable the virtual object to be displayed on an external display device coupled to the computer with an updated position, orientation, or position and orientation based on the signal regarding position, orientation, or position and orientation information from the controller.

6. The method of claim 5, wherein the position, orientation, or position and orientation information from the controller provides spatial information that describes three dimensions.

* * * * *

UNITED STATES PATENT AND TRADEMARK OFFICE
CERTIFICATE OF CORRECTION

PATENT NO. : 8,947,356 B2  
APPLICATION NO. : 13/254635  
DATED : February 3, 2015  
INVENTOR(S) : Kurata Page 1 of 1

It is certified that error appears in the above-identified patent and that said Letters Patent is hereby corrected as shown below:

In the Drawings

In Fig. 5, Sheet 5 of 6, for Tag "6", in Line 2, delete "Distlay" and insert -- Display --, therefor.

In Fig. 6, Sheet 6 of 6, for Tag "6", in Line 2, delete "Distlay" and insert -- Display --, therefor.

In the Specification

In Column 2, Line 43, delete "is" and insert -- is a --, therefor.

Signed and Sealed this  
Twenty-eighth Day of July, 2015

Michelle K. Lee  
*Director of the United States Patent and Trademark Office*